(12) United States Patent
Roberts et al.

(10) Patent No.: US 11,486,272 B2
(45) Date of Patent: Nov. 1, 2022

(54) SWITCHING ROLLER FINGER FOLLOWER WITH RE-SETTABLE STARTING POSITION

(71) Applicant: Eaton Intelligent Power Limited, Dublin (IE)

(72) Inventors: Leighton Roberts, Kalamazoo, MI (US); Anthony L. Spoor, Union City, MI (US); James R. Sheren, Grand Ledge, MI (US); Michael Campbell, Scotts, MI (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 16/975,360

(22) PCT Filed: Feb. 21, 2019

(86) PCT No.: PCT/EP2019/025050
§ 371 (c)(1),
(2) Date: Aug. 24, 2020

(87) PCT Pub. No.: WO2019/161976
PCT Pub. Date: Aug. 29, 2019

(65) Prior Publication Data
US 2020/0392875 A1 Dec. 17, 2020

Related U.S. Application Data

(60) Provisional application No. 62/634,748, filed on Feb. 23, 2018.

(51) Int. Cl.
*F01L 1/18* (2006.01)
*F01L 1/46* (2006.01)
*F16H 53/06* (2006.01)

(52) U.S. Cl.
CPC .............. *F01L 1/18* (2013.01); *F01L 1/46* (2013.01); *F16H 53/06* (2013.01); *F01L 2001/186* (2013.01)

(58) Field of Classification Search
CPC ......... F01L 1/18; F01L 1/46; F01L 2001/186; F16H 53/06
See application file for complete search history.

(56) References Cited

U.S. PATENT DOCUMENTS

| 5,544,626 A | 8/1996 | Diggs et al. |
| 6,314,928 B1 | 11/2001 | Baraszu et al. |

(Continued)

FOREIGN PATENT DOCUMENTS

| WO | WO-2013/156610 A1 | 10/2013 |
| WO | WO-2014/134601 A1 | 9/2014 |

(Continued)

OTHER PUBLICATIONS

International Search Report and Written Opinion for PCT/EP2019/025050 dated May 8, 2019; pp. 1-13.

(Continued)

*Primary Examiner* — Daniel D Yabut
(74) *Attorney, Agent, or Firm* — Mei & Mark, LLP

(57) ABSTRACT

A switching roller finger follower comprises an inner arm assembly. A pair of outer arms surround the inner arm assembly. A pivot axle connects the inner arm assembly to pivot with respect to the pair of outer arms from a starting position to a lost motion position. A latch assembly comprises a latch selectively movable from a latched position latching the inner arm assembly to move dependent with the outer arms and an unlatched position unlatching the inner arm assembly to pivot independent of the outer arms. A stop pin spans between the pair of outer arms and through an inner port in an axle of inner arm assembly. The stop pin (Continued)

comprises a clearance fit with the inner port, and the stop pin is configured pivotable independent of the outer arms. At least one return spring biases the stop pin toward the starting position.

17 Claims, 2 Drawing Sheets

(56) References Cited

U.S. PATENT DOCUMENTS

| | | | |
|---|---|---|---|
| 6,325,030 | B1 | 12/2001 | Spath et al. |
| 6,439,179 | B2 | 8/2002 | Hendriksma et al. |
| 6,481,400 | B2 | 11/2002 | Hendriksma et al. |
| 6,502,536 | B2 | 1/2003 | Lee et al. |
| 6,532,920 | B1 | 3/2003 | Sweetnam et al. |
| 6,604,498 | B2 | 8/2003 | Fernandez et al. |
| 6,901,894 | B2 | 6/2005 | Haas et al. |
| 6,948,466 | B2 | 9/2005 | Haas et al. |
| 7,318,402 | B2 | 1/2008 | Harman et al. |
| 7,377,247 | B2 | 5/2008 | Seitz |
| 7,484,487 | B2 | 2/2009 | Zurface et al. |
| 7,712,443 | B2 | 5/2010 | Gemein |
| 7,798,112 | B2 | 9/2010 | Zurface et al. |
| 7,798,113 | B2 | 9/2010 | Fischer et al. |
| 7,882,814 | B2 | 2/2011 | Spath et al. |
| 8,215,275 | B2 | 7/2012 | Church |
| 8,251,032 | B2 | 8/2012 | Manther |
| 8,327,750 | B2 | 12/2012 | Keller et al. |
| 8,534,182 | B2 | 9/2013 | Keller et al. |
| 8,607,753 | B2 | 12/2013 | Krause et al. |
| 8,635,980 | B2 | 1/2014 | Church |
| 8,726,862 | B2 | 5/2014 | Zurface et al. |
| 8,752,513 | B2 | 6/2014 | Zurface et al. |
| 8,783,219 | B2 | 7/2014 | Gunnel et al. |
| 8,915,225 | B2 | 12/2014 | Zurface et al. |
| 8,985,074 | B2 | 3/2015 | Zurface et al. |
| 9,016,252 | B2 | 4/2015 | Zurface et al. |
| 9,038,586 | B2 | 5/2015 | Schultheis et al. |
| 9,140,148 | B2 | 9/2015 | Church |
| 9,194,260 | B2 | 11/2015 | Zurface |
| 9,194,261 | B2 | 11/2015 | McCarthy, Jr. |
| 9,228,454 | B2 | 1/2016 | VanDeusen |
| 9,267,396 | B2 | 2/2016 | Zurface et al. |
| 9,284,859 | B2 | 3/2016 | Nielsen et al. |
| 9,291,075 | B2 | 3/2016 | Zurface et al. |
| 9,470,116 | B2 | 10/2016 | Cecur |
| 9,581,058 | B2 | 2/2017 | Radulescu et al. |
| 9,644,503 | B2 | 5/2017 | Zurface et al. |
| 9,664,075 | B2 | 5/2017 | McCarthy, Jr. |
| 9,702,279 | B2 | 7/2017 | Zurface et al. |
| 9,708,942 | B2 | 7/2017 | Zurface et al. |
| 9,726,052 | B2 | 8/2017 | Zurface et al. |
| 9,765,657 | B2 | 9/2017 | VanDeusen |
| 9,790,823 | B2 | 10/2017 | Zurface |
| 10,138,763 | B2 * | 11/2018 | Miyazawa ............... F01L 1/18 |
| 10,253,657 | B2 | 4/2019 | Uckermark et al. |
| 2001/0023675 | A1 | 9/2001 | Lee et al. |
| 2001/0027765 | A1 | 10/2001 | Hendriksma et al. |
| 2002/0011225 | A1 | 1/2002 | Hendriksma et al. |
| 2004/0237919 | A1 | 12/2004 | Haas et al. |
| 2005/0132989 | A1 | 6/2005 | Hendriksma et al. |
| 2005/0132990 | A1 | 6/2005 | Haas et al. |
| 2006/0157008 | A1 | 7/2006 | Lechner et al. |
| 2007/0101958 | A1 | 5/2007 | Seitz |
| 2007/0113809 | A1 | 5/2007 | Harman et al. |
| 2007/0186890 | A1 | 8/2007 | Zurface et al. |
| 2007/0283914 | A1 | 12/2007 | Zurface et al. |
| 2009/0217895 | A1 | 9/2009 | Spath et al. |
| 2010/0018482 | A1 | 1/2010 | Keller et al. |
| 2010/0319657 | A1 | 12/2010 | Dodi et al. |
| 2011/0226208 | A1 | 9/2011 | Zurface et al. |
| 2011/0226209 | A1 | 9/2011 | Zurface et al. |
| 2012/0037107 | A1 | 2/2012 | Church |
| 2012/0260875 | A1 | 10/2012 | Moeck et al. |
| 2013/0000582 | A1 | 1/2013 | Church |
| 2013/0068182 | A1 | 3/2013 | Keller et al. |
| 2013/0146008 | A1 | 6/2013 | Stoody |
| 2013/0220250 | A1 | 8/2013 | Gunnel et al. |
| 2013/0233265 | A1 | 9/2013 | Zurface et al. |
| 2013/0255612 | A1 | 10/2013 | Zurface et al. |
| 2013/0306013 | A1 | 11/2013 | Zurface et al. |
| 2013/0312506 | A1 | 11/2013 | Nielsen et al. |
| 2013/0312681 | A1 | 11/2013 | Schultheis et al. |
| 2013/0312686 | A1 | 11/2013 | Zurface et al. |
| 2013/0312687 | A1 | 11/2013 | Zurface et al. |
| 2013/0312688 | A1 | 11/2013 | VanDeusen |
| 2013/0312689 | A1 | 11/2013 | Zurface et al. |
| 2014/0041608 | A1 | 2/2014 | Zurface |
| 2014/0150745 | A1 | 6/2014 | Church |
| 2014/0190431 | A1 | 7/2014 | McCarthy, Jr. |
| 2014/0283768 | A1 | 9/2014 | Keller et al. |
| 2015/0128890 | A1 | 5/2015 | Cecur |
| 2015/0135893 | A1 | 5/2015 | Evans |
| 2015/0211394 | A1 | 7/2015 | Zurface et al. |
| 2015/0267574 | A1 | 9/2015 | Radulescu et al. |
| 2015/0369095 | A1 | 12/2015 | Spoor et al. |
| 2015/0371793 | A1 | 12/2015 | Sheren et al. |
| 2015/0377093 | A1 | 12/2015 | Church |
| 2016/0061067 | A1 | 3/2016 | Schultheis et al. |
| 2016/0061068 | A1 | 3/2016 | Zurface |
| 2016/0084117 | A1 | 3/2016 | Zurface et al. |
| 2016/0108766 | A1 | 4/2016 | Zurface et al. |
| 2016/0115831 | A1 | 4/2016 | Spoor et al. |
| 2016/0130991 | A1 | 5/2016 | Zurface et al. |
| 2016/0138435 | A1 | 5/2016 | Zurface et al. |
| 2016/0138438 | A1 | 5/2016 | Genise et al. |
| 2016/0138484 | A1 | 5/2016 | Nielsen et al. |
| 2016/0146064 | A1 | 5/2016 | Spoor et al. |
| 2016/0169065 | A1 | 6/2016 | VanDeusen |
| 2016/0230619 | A1 | 8/2016 | McCarthy, Jr. |
| 2016/0273413 | A1 | 9/2016 | Sheren et al. |
| 2017/0002698 | A1 | 1/2017 | Cecur |
| 2017/0248073 | A1 | 8/2017 | McCarthy, Jr. |
| 2018/0045081 | A1 | 2/2018 | Rehm et al. |
| 2018/0156140 | A1 | 6/2018 | Vance et al. |
| 2018/0238198 | A1 | 8/2018 | Uckermark et al. |
| 2018/0320603 | A1 | 11/2018 | Vance et al. |
| 2019/0063268 | A1 | 2/2019 | Buonocore et al. |
| 2019/0284971 | A1 | 9/2019 | Vance et al. |
| 2019/0309659 | A1 | 10/2019 | Vance |
| 2019/0309660 | A1 | 10/2019 | Vance |
| 2020/0056512 | A1 | 2/2020 | Vance |

FOREIGN PATENT DOCUMENTS

| | | |
|---|---|---|
| WO | WO-2014/134601 A9 | 9/2014 |
| WO | WO-2016/155978 A1 | 10/2016 |
| WO | WO-2016/176300 A1 | 11/2016 |
| WO | WO-2017/024249 A1 | 2/2017 |
| WO | WO-2017/144706 A1 | 8/2017 |
| WO | WO-2018/068041 A1 | 4/2018 |
| WO | WO-2018/068043 A1 | 4/2018 |
| WO | WO-2018/068045 A1 | 4/2018 |
| WO | WO-2018/068046 A1 | 4/2018 |

OTHER PUBLICATIONS

International Search Report and Written Opinion for PCT/US2016/045842 dated Oct. 28, 2016 pp. 1-23.
International Search Report and Written Opinion for PCT/US2017/055766; dated Jan. 22, 2018; pp. 1-21.
International Search Report and Written Opinion for PCT/US2017/055777 dated Jan. 24, 2018; pp. 1-23.
International Search Report and Written Opinion for PCT/US2017/055785 dated Jan. 17, 2018; pp. 1-18.
International Search Report and Written Opinion for PCT/US2017/055788; dated Jan. 24, 2018; pp. 1-17.
Melfast, Inc.; Top 5 Basic Elements of Dowel Pins; Oct. 5, 2013; pp. 1-6.

* cited by examiner

SWITCHING ROLLER FINGER FOLLOWER WITH RE-SETTABLE STARTING POSITION

This is a § 371 National Stage entry of Patent Cooperation Treaty Application No. PCT/EP2019/025050, filed Feb. 21, 2019, which claims the benefit of U.S. provisional application No. 62/634,748, filed Feb. 23, 2018, all of which are incorporated herein by reference and relied upon for the benefit of priority.

FIELD

This application provides lash adjustment structures and techniques for an overhead cam switching roller finger follower.

BACKGROUND

An overhead cam switching roller finger follower is designed to switch between two motion modes. A spring biases an inner arm with respect to an outer arm so that the inner arm returns to a starting position. It is difficult to set the starting position of the inner arm because of variances in spring strength and tolerance stack up. So, it is desirable to set the starting position with means for accommodating variances and stack up.

SUMMARY

The methods and devices disclosed herein overcome the above disadvantages and improves the art by way of a switching roller finger follower which comprises an inner-arm assembly comprising an axle and an inner port through the axle. A pair of outer arms surround the inner arm assembly. Each of the pair of outer arms comprise inner shoulders facing the inner arm assembly. A pivot axle connects the inner arm assembly to pivot with respect to the pair of outer arms from a starting position to a lost motion position. A latch assembly comprises a latch selectively movable from a latched position latching the inner arm assembly to move dependent with the outer arms and an unlatched position unlatching the inner arm assembly to pivot independent of the outer arms. A stop pin spans between the pair of outer arms and through the inner port. The stop pin comprises a clearance fit with the inner port, and the stop pin is configured pivotable independent of the outer arms. At least one return spring biases the stop pin toward the inner shoulders so as to bias the inner arm assembly toward the starting position.

Additional objects and advantages will be set forth in part in the description which follows, and in part will be obvious from the description, or may be learned by practice of the disclosure. The objects and advantages will also be realized and attained by means of the elements and combinations particularly pointed out in the appended claims.

It is to be understood that both the foregoing general description and the following detailed description are exemplary and explanatory only and are not restrictive of the claimed invention.

DETAILED DESCRIPTION

Figure 1:
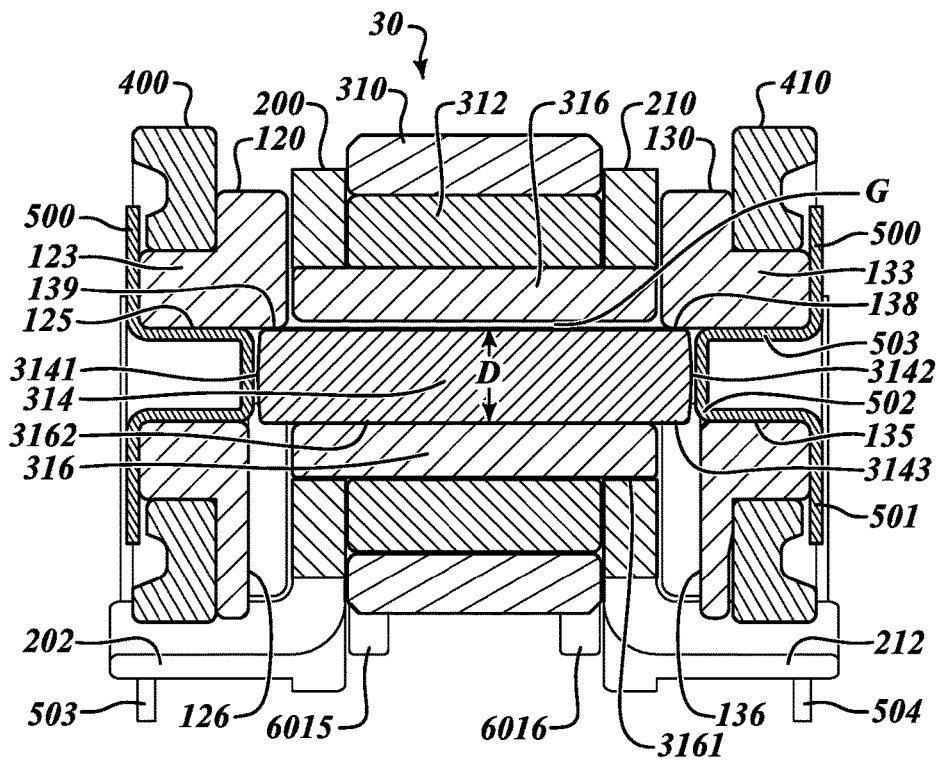
FIG. 1 is a cross-section view of an overhead cam switching roller finger follower ("SRFF").
Figure 2:
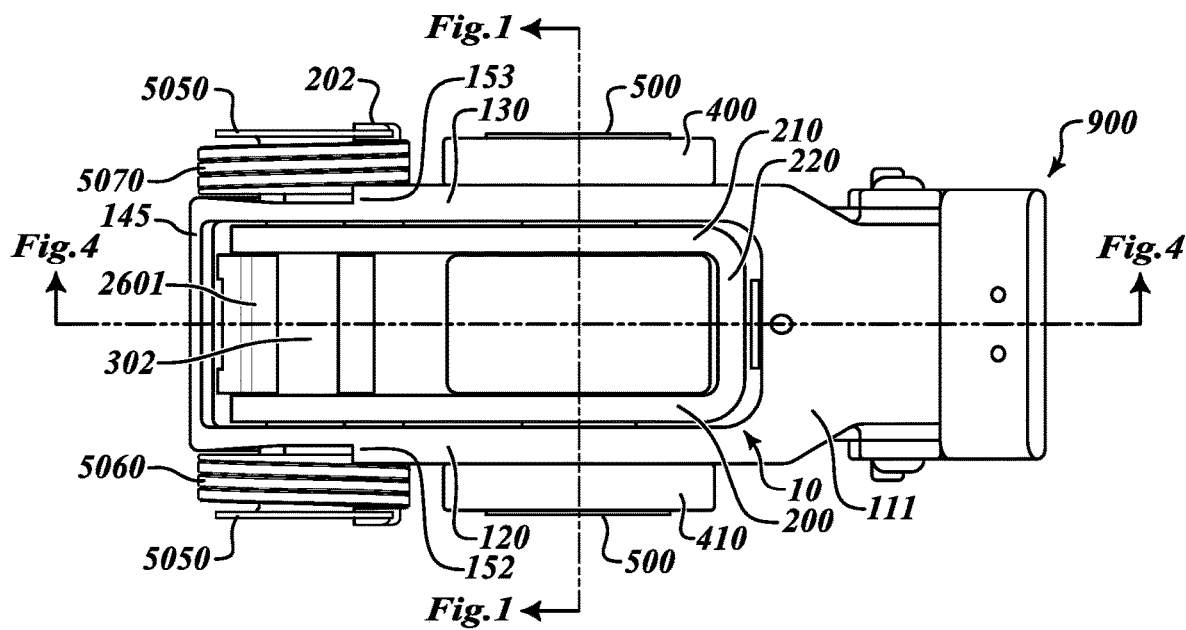
FIG. 2 is a top view of the SRFF.
Figure 3:
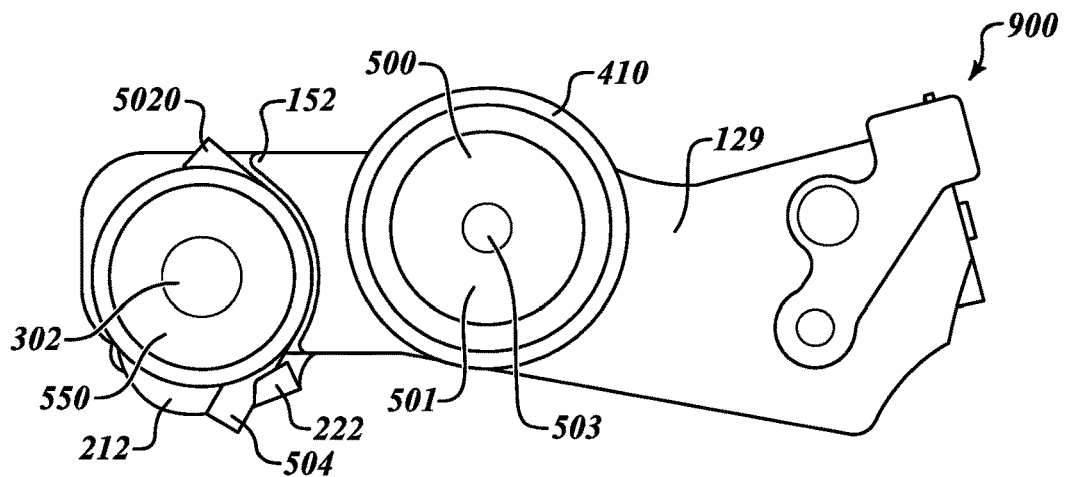
FIG. 3 is a side view of the SRFF.

Reference will now be made in detail to the examples which are illustrated in the accompanying drawings. Wherever possible, the same reference numbers will be used throughout the drawings to refer to the same or like parts. Directional references such as "left" and "right" are for ease of reference to the figures.

This application provides lash adjustment structures and techniques for an overhead cam switching roller finger follower ("SRFF"), sometimes called a "rocker arm." While a 3-roller rocker arm is shown in the figures, it is possible to use the techniques disclosed herein with other SRFFs, such as those comprising slider pads instead of rollers. As an example of these alternative SRFFS, the outer rollers can be replaced with slider pads. Alternatively or additionally, the inner roller can be replaced with a slider pad. And, the disclosed lash adjustment structures and techniques can be used with these alternative SRFFs.

A strategy was developed to provide a stop of motion between the inner arm assembly 10 and outer arms 120, 130 on a Switching Roller Finger Follower (SRFF). The design involves a single stop pin 314, select fit for size to manage lash and set a starting position, passing through the inner arm assembly 10 and contacting shoulders 138, 139 on both inner sides of the outer arms. The stop pin 314 is retained by outer roller retainers 500 and is crowned on the ends 3141, 3142 to prevent sticking during operation. The stop pin 314 can be assembled in the SRFF as by drop-in assembly through bores 125, 135 in-line with the shoulders 138, 139.

In a SRFF, lash management is an important design consideration. In a 3 lobe SRFF, such as the 3-roller rocker arm shown in the Figures, there are two areas where lash is introduced in the rocker arm: at the latch 901 of the latch assembly 900; and between the inner roller assembly 30 and the outer rollers 400, 410. The lash at the latch 901 can result from the return spring, or as drawn with two return springs 5060, 5070, pushing the latching arm 220 of the inner arm assembly 10 above the latch 901 so that the latching arm 220 doesn't drag against the latch 910 during latch assembly actuation. This "latch lash" can vary forces pushing up on the overhead cam and can cause uneven presentation of the inner roller assemblies 30 to the overhead cam rail when a series of such SRFFs are assembled into a valvetrain.

The "roller lash" between the inner roller assembly 30 and outer arm rollers 400, 410 can be a difference in where the inner roller 310 aligns with respect to an overhead cam versus where the outer rollers 400, 410 align with respect to that overhead cam. Said in broader terms, the second kind of lash is related to a difference in outer arms 120, 130 position with respect to inner arm assembly 10 position.

The design of the stop pin 314 manages both kinds of lash. The design uses a stop pin 314 in an inner port 3162 through an axle 316 of the inner roller assembly 30. As shown, the axle 316 is fitted to inner arms 200, 210, such as at opening 3161, so that axle 316 is stationary with respect to the inner arms. Optional needle bearings 312 can surround axle 316. Outer layer of inner roller assembly 30 is a roller 310 that is acted on by an overhead cam during use. The stop pin 314 sets the location of the outer diameter of the roller 310 relative to the outer arms, which is a calibratable location corresponding to the starting position.

The stop pin 314 is select fit for size to achieve the proper lash. By "select fit," the stop pin 314 can vary from customer application to customer application to adjust the lash and set the starting position of the inner arm assembly 10 with respect to the outer arms 120, 130. If more lash is desired or if the roller assembly 30 should have a starting position lowered, the stop pin 314 can comprise a larger diameter D to draw the inner arm down closer to the latch 901. If less lash is desired or if the starting position should be raised closer to the overhead cam, the pin can comprise a smaller diameter D, which increases the gap G between stop pin 314 and inner port 3161 and enables the inner roller assembly 30 to be biased closer to the overhead cam. At times, there are variances even in the stop pins themselves, requiring exchange of stop pins sold or manufactured as "same size." Gap G persists despite which stop pin is select fit so that the stop pin can slide into the axle 316 without being stuck, as would occur with an interference, friction, or press-fitting. Gap G can be a clearance fitting, and gap G can result in a large clearance between axle 316 and stop pin 314. Grinding or other machining or manufacturing techniques can be used to form the different sized stop pins 314.

The unitary stop pin 314 and pin selection and alternative exchange techniques improve over the art because the "same size" stop pins, even if requiring exchange, are cheaper pieces to stock and exchange than some other components of the SRFF. Even if exchanging the stop pin, the SRFF is not scrapped in total due to tolerance stack up. And, having an array of different sized stop pins is a low scrap way to provide customer-specific variation without complete re-design or re-manufacture of the SRFF. While part count stock overall may increase for manufacture of some SRFFs, the part count of the SRFF itself remains low and the quantity of scrap during manufacture can be restricted to the stop pins and thereby total scrap can be kept low.

The inner roller assembly 30 can be installed with respect to the outer arm assembly with a pivot axle 302 provided to set relative motion therebetween. The outer arm assembly can comprise a valve end 12 and a pivot end 11. The pivot end 11 can comprise a latch body for receiving the latch assembly 900 herein shown as an electromechanical latch, though numerous alternative latch assemblies exist such as hydraulic and mechanical latch assemblies. A hydraulic lash adjuster cup 117 is shown for when a hydraulic lash adjuster is mounted to the SRFF. The pivot end can pivot on the HLA during engine system use.

The valve end 12 can comprise the pivot axle 302 and an integrally formed valve seat or a valve seat insert 601 for mounting a stem end of a valve. Valve seat insert can comprise, among numerous valve seat insert alternatives, a valve surface 6012 for seating valve stem end, valve guides 6015, 6016 for constraining valve stem end, and mounting cusps 2601 for securing the valve seat 601 with respect to the pivot axle 302.

At least one return spring biases the stop pin 314 toward the inner shoulders 123, 133 so as to bias the inner arm assembly 10 toward the starting position. While pivot end return springs or a single return spring on the pivot axle 302 among other variations of return spring arrangements can be used in alternative SRFFs, the illustrated example comprises valve end return springs 5060, 5070 coiled around the pivot axle 302. Spring caps 5050 can secure the return springs in place. The outer arms 120, 130 can comprise bias points, or shoulders 152, 153, for biasing ends 5010, 520 of the return springs. Inner arms 200, 210 can comprise inner arm extensions 202, 212 comprising notches 222 configured for biasing other ends 503, 504 of the return springs. An outer arm connector 145 can span across the valve end 12 of the outer arms 120, 130 and restrict the motion of the inner arm assembly 10 with respect to the outer arms as by abutting the inner arm extensions 202, 212 at an extrema of lost motion movement of the inner arm assembly 10. Numerous return spring alternatives and return spring mounting alternatives are compatible with the disclosure to return the inner arm assembly 10 to a starting position with respect to outer arms.

The inner sides of the outer arms 120, 130 can be formed with inner grooves 126, 136 to serve as pump-down guides for the stop pin 314. During lost motion travel of the stop pin 314, it can move through the inner grooves 126, 136 as the inner arms 200, 210 pivot within the outer arms 120, 130. The crowned ends 3141, 3142 slide against the inner grooves 126, 136 without sticking when the overhead cam actuates to move an unlatched inner arm assembly 30, and the stop pin 314 returns to a position abutting shoulders 138, 139 when the overhead cam is at base circle or when the inner arm assembly 30 is latched. Because of the clearance fit and gap G, the stop pin 314 can move, and the inner grooves can guide the stop pin without causing the inner arm assembly pivoting motion to be dependent on the outer arms motion.

Figure 4:
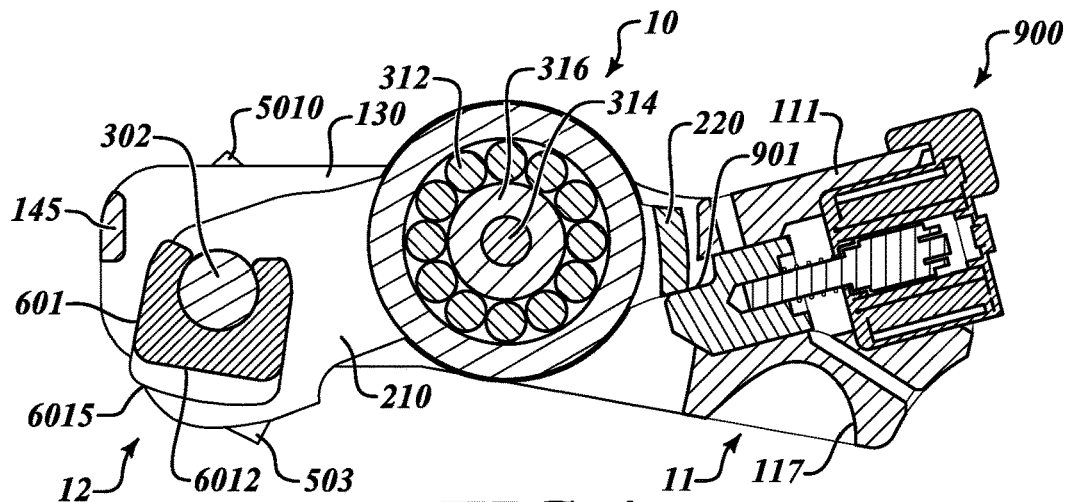
FIG. 4 is a cross-section view of a latched SRFF.
Figure 5:
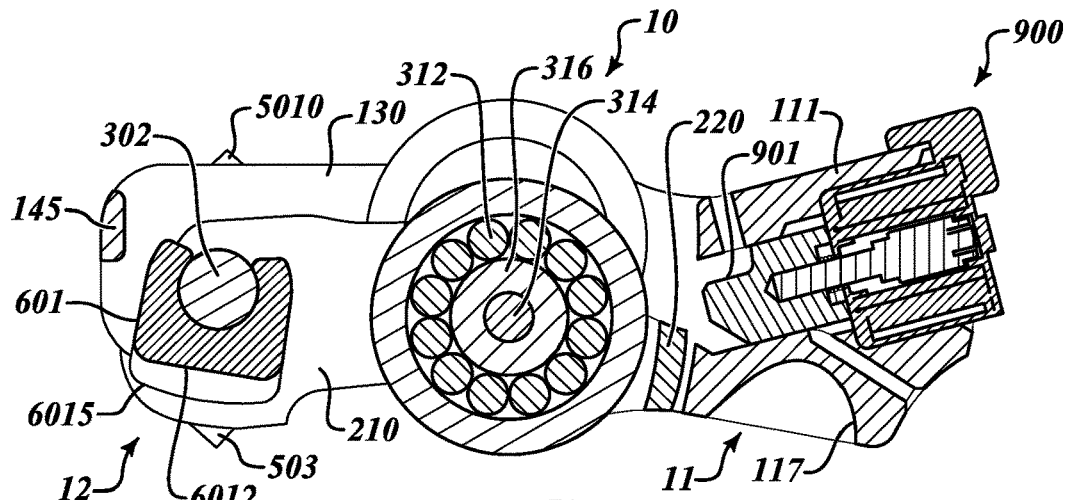
FIG. 5 is a cross-section view of an unlatched SRFF.

The latch assembly 900 comprises the latch 901, and the latch is selectively movable from a latched position shown in FIG. 4 to an unlatched position shown in FIG. 5. Unlatched position retracts latch 901 into the latch body 111 joining the outer arms 120, 130. In the latched position, the inner arm assembly 10 is latched to move dependent with the outer arms 120, 130. "Dependent with" means that the outer arms and inner arm assembly move together. The overhead cam actuates on the SRFF and pushes on the SRFF. The gap G closes during actuation, but the latching arm 220 is latched against latch 901 and the forces from the overhead cam press the latched SRFF to move dependently. Via control of the latch assembly (hydraulic, mechanical or electro-mechanical) the latch can be selected to move to an unlatched position unlatching the inner arm assembly to pivot independent of the outer arms. The stop pin 314 can move in inner grooves 126, 136, but the pivoting motion is "independent," meaning that the outer arms 120, 130 are no longer joined in a way that transfers overhead cam forces to the inner arm assembly 10. When considering the stop pin 314 spanning between the pair of outer arms 120, 130 and through the inner port 3162, the stop pin 314 is configured pivotable independent of the outer arms, and the stop pin can pivot independently of the outer arms when the latch 901 is in the unlatched position.

The stop pin 314 is "select fit," which can comprise having a stock of stop pins of different diameters D. Depending upon the chosen customer lash, stop pins of one diameter or another can be inserted into bores 125, 135 in the outer arms 120, 130 and into axle 316 to set the starting position. Likewise, if assembly measurements indicate the inner arm assembly 10 should move with respect to the outer arms, due to tolerance stack up or other variances, the stop pins 314 can be exchanged or selected to achieve a desired starting position. A gauge, mount, caliper, or other calibration device or technique can be used to aid in selecting an appropriate diameter stop pin 314.

The bores 125, 135 aligned with the inner port 3162 of hollow axle 316 achieve a design that is conducive to the select fit process. Once the stop pin of appropriate diameter is installed in the hollow port, the retention of the stop pin 314 is accomplished by utilizing retainers 500. The retainers can achieve multiple functions of retaining the stop pin 314 inside the SRFF, providing a sliding surface for the ends 3141, 3142 of the stop pin 314, and securing the outer rollers 400, 410.

Retainers 500 can be pressed into bores 125, 135 in cantilevered posts 123, 133 on the outer arms 120, 130. The retainers 500 can be identical, as drawn, or can be "left handed" and "right handed" as when the bores are not identically sized, as when stop pin 314 is installed or exchanged from only one side of the SRFF instead of from either side as drawn. A flat head 501 can be used for a low footprint and can be used to retain the outer rollers 400, 410 in position on the cantilevered posts 123, 133. A shank 503 with a crowned end 502 can seat in the bore 125 or 135. The crowned end 502 provides a non-stick surface against with the stop pin ends 3141, 3142 can slide. When the inner arm assembly 10 moves down, the stop pin 314 moves out of the range of the retainers 500. To keep the stop pin 314 aligned when the inner arm assembly 10 moves back to the starting position, the ends 502 of the stop pin 314 can be crowned to ensure that the stop pin is centered if the stop pin contacts the retainer 500 on its way back.

The SRFF can be used in a Type II overhead cam valvetrain. A lash adjuster can be seated beneath the latch assembly 900. The latch can be, for example, hydraulic, electromechanical, mechanical, among variations. When the SRFF is latched, the inner arm assembly 10 and outer arms 120, 130 move together with the cam lobe to provide motion to the affiliated valve. When the latch 901 on the SRFF is unlatched, the inner arm assembly 10 moves downward with the cam lobe relative to the outer arms 120, 130. Depending on the cam lobe arrangement, the outer arms can remain stationary or can provide a variable valve actuation ("VVA") functionality. The pivot axle 302 can connect the inner arm assembly 10 to pivot with respect to the pair of outer arms 120, 130 from the starting position to a "lost motion" position. Valve deactivation (lack of motion) or early or late opening or closing can be accomplished by selecting the "lost motion" position and the functionality ascribed thereto. Variables comprise, among others, the presence or absence of outer rollers or outer sliders, the shape and number of overhead lobes, and the location of the inner arm assembly with respect to the outer arms.

Methods of select-fitting a stop pin within a switching roller finger follower can comprise biasing an inner arm assembly 10 toward a starting position with respect to an outer arm. A calibratable device, such as a gauge, caliper, micrometer, chuck, or other testing device, can be applied to the SRFF to gauge where the inner arm assembly is with relation to a preselected starting position. A stop pin of a diameter that sets the inner arm assembly in the starting position can be selected. As above, this can comprise selection from a stock of stop pins of different diameters. The stop pin can be inserted within the inner arm assembly 10 to set the inner arm assembly at the starting position. The starting position can be re-gauged with the calibratable device. If needed, the stop pin can be exchanged with a selected second stop pin to re-set the starting position.

In an alternative select-fitting or lash setting method, inner arm assembly 10 is biased toward a starting position with respect to an outer arm. The starting position is gauged with a calibratable device. Because the inner arm assembly already comprises a stop pin, the stop pin is exchanged with a second stop pin of a diameter that re-sets the starting position of the inner arm assembly.

Other implementations will be apparent to those skilled in the art from consideration of the specification and practice of the examples disclosed herein.

What is claimed is:

1. A switching roller finger follower, comprising:
   an inner arm assembly comprising an axle and an inner port through the axle;
   an outer arm assembly comprising a pair of outer arms surrounding the inner arm assembly, each of the pair of outer arms comprising an inner shoulder and an inner side facing the inner arm assembly, and each of the pair of outer arms comprising a bore in-line with the respective shoulder;
   a stop pin spanning between the pair of outer arms and through the inner port, the stop pin comprising a clearance fit with the inner port, and the stop pin configured to selectively pivot between the inner sides of the outer arms;
   at least one return spring biasing the stop pin toward the inner shoulders;
   a pair of retainers respectively seated in each respective bore, wherein the pair of retainers cover the respective bore so that the stop pin cannot exit the respective bore in the pair of outer arms;
   a pivot axle connecting the inner arm assembly to pivot; and
   a latch assembly comprising a latch selectively movable from a latched position latching the inner arm assembly to move dependent with the outer arms to an unlatched position unlatching the inner arm assembly to pivot independent of the outer arms.

2. The switching roller finger follower of claim 1, wherein the pair of outer arms further comprise cantilevered posts on outer surfaces of the outer arms, and each bore passes through the cantilevered posts.

3. The switching roller finger follower of claim 2, further comprising a pair of outer rollers, the pair of outer rollers respectively mounted to the cantilevered posts.

4. The switching roller finger follower of claim 3, wherein each of the retainers comprise a flat head configured for fastening a respective outer roller of the pair of outer rollers to the respective cantilevered post.

5. The switching roller finger follower of claim 2, wherein each bore and the inner port are configured for exchanging the stop pin for a second stop pin to re-set the inner arm assembly to a second starting position.

6. The switching roller finger follower of claim 1, wherein each of the retainers comprise a flat head, a shank, and a crowned end, and wherein the respective crowned ends are configured so that the stop pin is slidable with respect to them.

7. The switching roller finger follower of claim 1, wherein the inner arm assembly comprises an inner roller on the axle, and wherein the axle bears the inner roller with respect to the inner arm.

8. The switching roller finger follower of claim 1, wherein each of the pair of outer arms comprise an inner groove facing the inner arm assembly, and wherein the stop pin is movable in the inner groove when the inner arm assembly pivots with respect to the pair of outer arms.

9. The switching roller finger follower of claim 1, wherein the stop pin comprises crowned ends.

10. The switching roller finger follower of claim 1, wherein varying a diameter of the stop pin varies the extent to which the inner arm assembly pivots with respect to the pair of outer arms.

11. The switching roller finger follower of claim 1, wherein varying a diameter of the stop pin varies a starting position of the inner arm assembly with respect to the pair of outer arms.

12. The switching roller finger follower of claim 1, wherein each bore and the inner port are configured so that the stop pin can be exchanged for a second stop pin to re-set the inner arm assembly to a second starting position.

13. The switching roller finger follower of claim 1, configured so that, when the stop pin is installed, it cannot move in its respective bore.

14. A method of select-fitting a stop pin within a switching roller finger follower, comprising:
- biasing an inner arm assembly toward a starting position with respect to an outer arm assembly;
- gauging the starting position with a calibratable device;
- selecting a stop pin of a diameter that sets the inner arm assembly in the starting position; and
- inserting the stop pin through a bore in the outer arm assembly and into an inner port within the inner arm assembly to set a gap between the stop pin and the inner port to thereby set the inner arm assembly at the starting position,
- wherein the stop pin is inserted into the inner port so that the stop pin is pivotable between inner sides of the outer arm assembly, and inserting a retainer into the bore to cover the bore.

15. The method of claim 14, further comprising: prior to inserting the retainer to cover the bore, re-gauging the starting position with the calibratable device; and
- exchanging the stop pin with a second stop pin to re-set the starting position.

16. The method of claim 14, further comprising gauging the stop pin independently from the starting position.

17. A method for setting lash of a switching roller finger follower, comprising:
- biasing an inner arm assembly toward a starting position with respect to an outer arm assembly, the inner arm assembly comprising an axle, an inner port through the axle, and a first stop pin of a first diameter that limits the travel of the inner arm assembly toward the starting position, the stop pin configured to pivot away from the starting position between inner sides of the outer arm assembly, the stop pin comprising a clearance fit within the inner arm assembly, the stop pin spanning between the pair of outer arms and through the inner port, the stop pin comprising a clearance fit with the inner port, the stop pin configured to selectively pivot between the inner sides of the outer arms, the outer arm assembly comprising a pair of outer arms surrounding the inner arm assembly, each of the pair of outer arms comprising an inner shoulder and an inner side facing the inner arm assembly, and each of the pair of outer arms comprising a bore in-line with the respective shoulder;
- biasing the stop pin toward the inner shoulders with at least one return spring;
- gauging the starting position with a calibratable device;
- exchanging the first stop pin within the inner arm assembly with a second stop pin of a second diameter that re-sets the starting position of the inner arm assembly; and
- inserting a pair of retainers respectively into each bore of the pair of outer arms so that the stop pin cannot exit through each bore.

* * * * *